US012643465B2

(12) United States Patent
Pai Raikar et al.

(10) Patent No.: US 12,643,465 B2
(45) Date of Patent: Jun. 2, 2026

(54) SMART TRAILER INTENT SIGNALING SYSTEMS AND METHODS

(71) Applicant: Torc Robotics, Inc., Blacksburg, VA (US)

(72) Inventors: Akshay Pai Raikar, Austin, TX (US); William Gray Davis, Austin, TX (US); Joseph R. Fox-Rabinovitz, Austin, TX (US)

(73) Assignee: TORC ROBOTICS, INC., Blacksburg, VA (US)

( * ) Notice: Subject to any disclaimer, the term of this patent is extended or adjusted under 35 U.S.C. 154(b) by 59 days.

(21) Appl. No.: 18/670,384

(22) Filed: May 21, 2024

(65) Prior Publication Data

US 2025/0360868 A1 Nov. 27, 2025

(51) Int. Cl.
B60Q 1/50 (2006.01)
G06V 20/58 (2022.01)

(52) U.S. Cl.
CPC ............. B60Q 1/507 (2022.05); B60Q 1/545 (2022.05); G06V 20/58 (2022.01)

(58) Field of Classification Search
CPC ......... B60Q 1/507; B60Q 1/545; G06V 20/58
See application file for complete search history.

(56) References Cited

U.S. PATENT DOCUMENTS

| | | | |
|---|---|---|---|
| 9,969,326 B2 | 5/2018 | Ross et al. | |
| 10,261,513 B2 | 4/2019 | Reiley et al. | |
| 10,787,177 B2 | 9/2020 | Fritz et al. | |
| 11,104,270 B1 * | 8/2021 | Timms ..................... | B60Q 1/44 |
| 2004/0215464 A1 | 10/2004 | Nelson | |
| 2022/0314876 A1 | 10/2022 | Luo | |
| 2023/0051632 A1 * | 2/2023 | Bellare ................. | B60W 30/16 |

* cited by examiner

*Primary Examiner* — Brian P Sweeney
(74) *Attorney, Agent, or Firm* — Armstrong Teasdale LLP

(57) ABSTRACT

A system for signaling intent of an autonomous vehicles. The system is comprised of a memory storing executable instructions representing a signaling display module on a trailer of an autonomous vehicle. The system also comprises a processor coupled to the memory and configured to execute the signaling display module. The processor is configured to receive data from an autonomy computing system descriptive of a condition near the autonomous vehicle, process the data to generate a message relating to the condition indicating a remedial action of the autonomous vehicle in response to the condition, and transmit the message to a signaling display on the trailer prior to executing the remedial action.

20 Claims, 7 Drawing Sheets

100

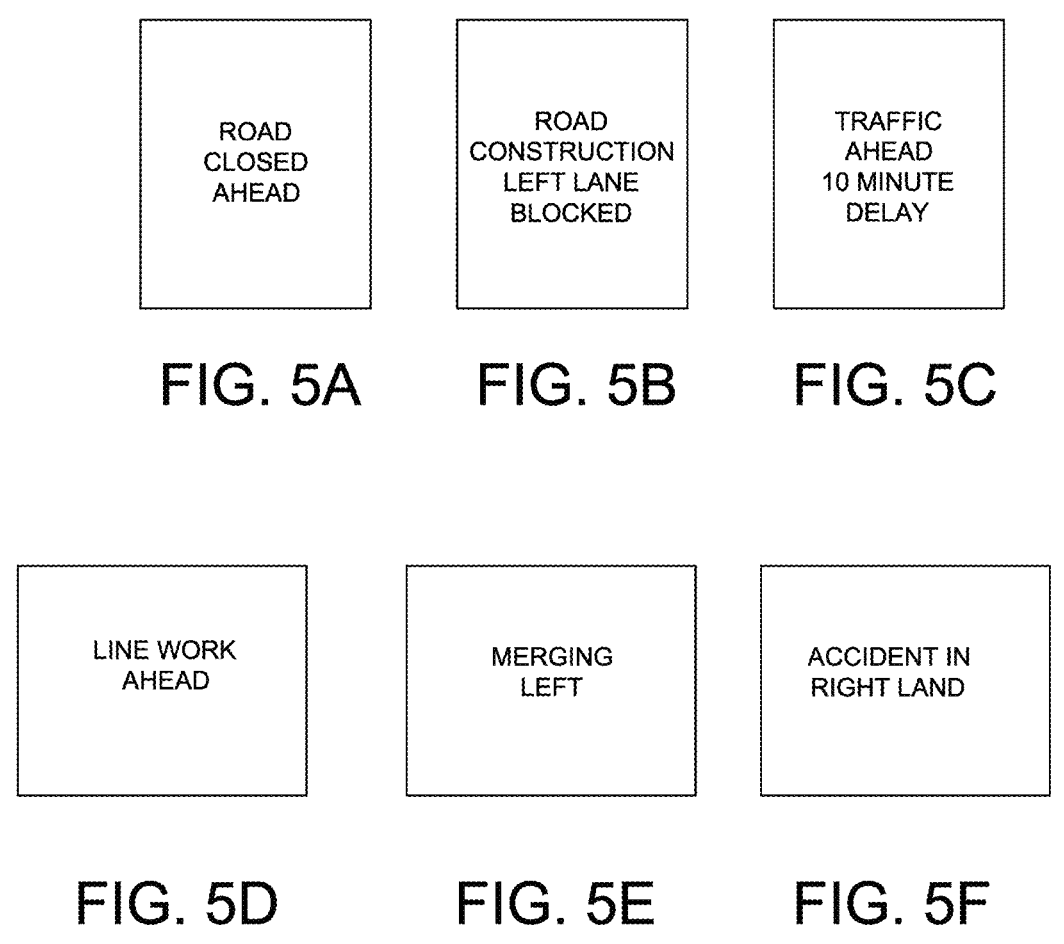

ROAD
CLOSED
AHEAD

FIG. 5A

ROAD
CONSTRUCTION
LEFT LANE
BLOCKED

FIG. 5B

TRAFFIC
AHEAD
10 MINUTE
DELAY

FIG. 5C

LINE WORK
AHEAD

FIG. 5D

MERGING
LEFT

FIG. 5E

ACCIDENT IN
RIGHT LAND

FIG. 5F

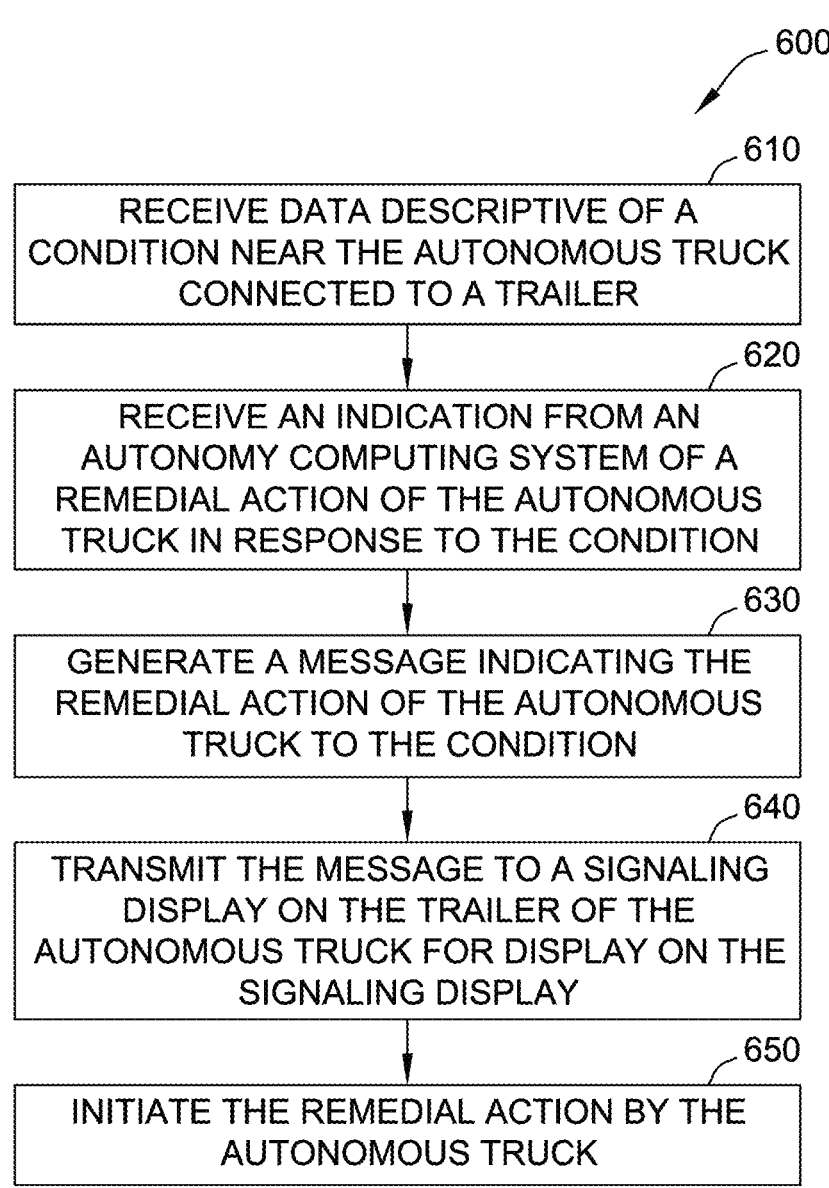

600

610

RECEIVE DATA DESCRIPTIVE OF A CONDITION NEAR THE AUTONOMOUS TRUCK CONNECTED TO A TRAILER

620

RECEIVE AN INDICATION FROM AN AUTONOMY COMPUTING SYSTEM OF A REMEDIAL ACTION OF THE AUTONOMOUS TRUCK IN RESPONSE TO THE CONDITION

630

GENERATE A MESSAGE INDICATING THE REMEDIAL ACTION OF THE AUTONOMOUS TRUCK TO THE CONDITION

640

TRANSMIT THE MESSAGE TO A SIGNALING DISPLAY ON THE TRAILER OF THE AUTONOMOUS TRUCK FOR DISPLAY ON THE SIGNALING DISPLAY

650

INITIATE THE REMEDIAL ACTION BY THE AUTONOMOUS TRUCK

FIG. 6

SMART TRAILER INTENT SIGNALING SYSTEMS AND METHODS

TECHNICAL FIELD

The field of the disclosure relates generally to autonomous vehicles and, more specifically, systems and methods for communicating the operational intentions of an autonomous vehicle, particularly an autonomous vehicle to surrounding non-autonomous vehicles.

BACKGROUND OF THE INVENTION

Autonomous vehicles rely on existing road infrastructure to transport goods from one location to another. Specifically, autonomous vehicles are designed to navigate from origin to destination without human intervention. However, their integration into the existing traffic ecosystem presents unique challenges, particularly in their interaction with non-autonomous vehicles. Autonomous trucks, due to their large size, can significantly obscure the field of view for non-autonomous vehicles more than other types of autonomous vehicles. Accordingly, the combination of autonomous operation, the potential distrust of autonomous systems by non-autonomous drivers, and the reduced visibility decreases the ability for non-autonomous vehicles to trust or anticipate the operation of an autonomous vehicle.

There is a need for an improved system and method that enables an autonomous vehicle, particularly an autonomous truck, to communicate its operational intentions to surrounding non-autonomous vehicles while mitigating the visual obstruction caused by the autonomous vehicle size.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, the disclosed system for signaling intent on a trailer of an autonomous vehicle includes at least one sensor disposed on the autonomous vehicle, the at least one sensor configured to generate sensor data descriptive of a condition sensed near the autonomous vehicle. The system also includes a processing system communicatively coupled to the at least one sensor, the processing system may include a processor coupled to a memory, the memory storing executable instructions that, upon execution by the processor, configure the processor to: receive data from an autonomy computing system of the autonomous vehicle corresponding to a remedial action of the autonomous vehicle in response to the condition, and process the sensor data and the data from the autonomy computing system to generate a message indicating the remedial action of the autonomous vehicle. The system also includes a signaling display attached to a trailer of an autonomous vehicle, the signaling display configured to display at least one of the sensor data or the message, where the signaling display is communicatively coupled to the processing system.

In another aspect, the disclosed processing system for signaling intent of an autonomous vehicle includes a memory storing executable instructions representing a signaling display module on a trailer of an autonomous vehicle.

The system also includes a processor coupled to the memory and configured to execute the signaling display module, the processor, upon execution of the signaling display module, configured to: receive data from an autonomy computing system descriptive of a condition near the autonomous vehicle; process the data to generate a message relating to the condition, where the message indicates a remedial action of the autonomous vehicle in response to the condition; and transmit the message to a signaling display on the trailer prior to executing the remedial action of the autonomous vehicle.

In yet another aspect, the disclosed method of signaling intent of an autonomous vehicle includes receiving data descriptive of a condition near the autonomous vehicle connected to a trailer; receiving an indication from an autonomy computing system of a remedial action of the autonomous vehicle in response to the condition; generating, based on the indication, a message indicating the remedial action of the autonomous vehicle to the condition; transmitting the message to a signaling display on the trailer of the autonomous vehicle for display on the signaling display; and initiating the remedial action by the autonomous vehicle.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 5A-F are illustrations of example signaling displays;

FIG. 6 is a flow diagram of one embodiment of a method of intent signaling on an autonomous vehicle.

Figure 1:
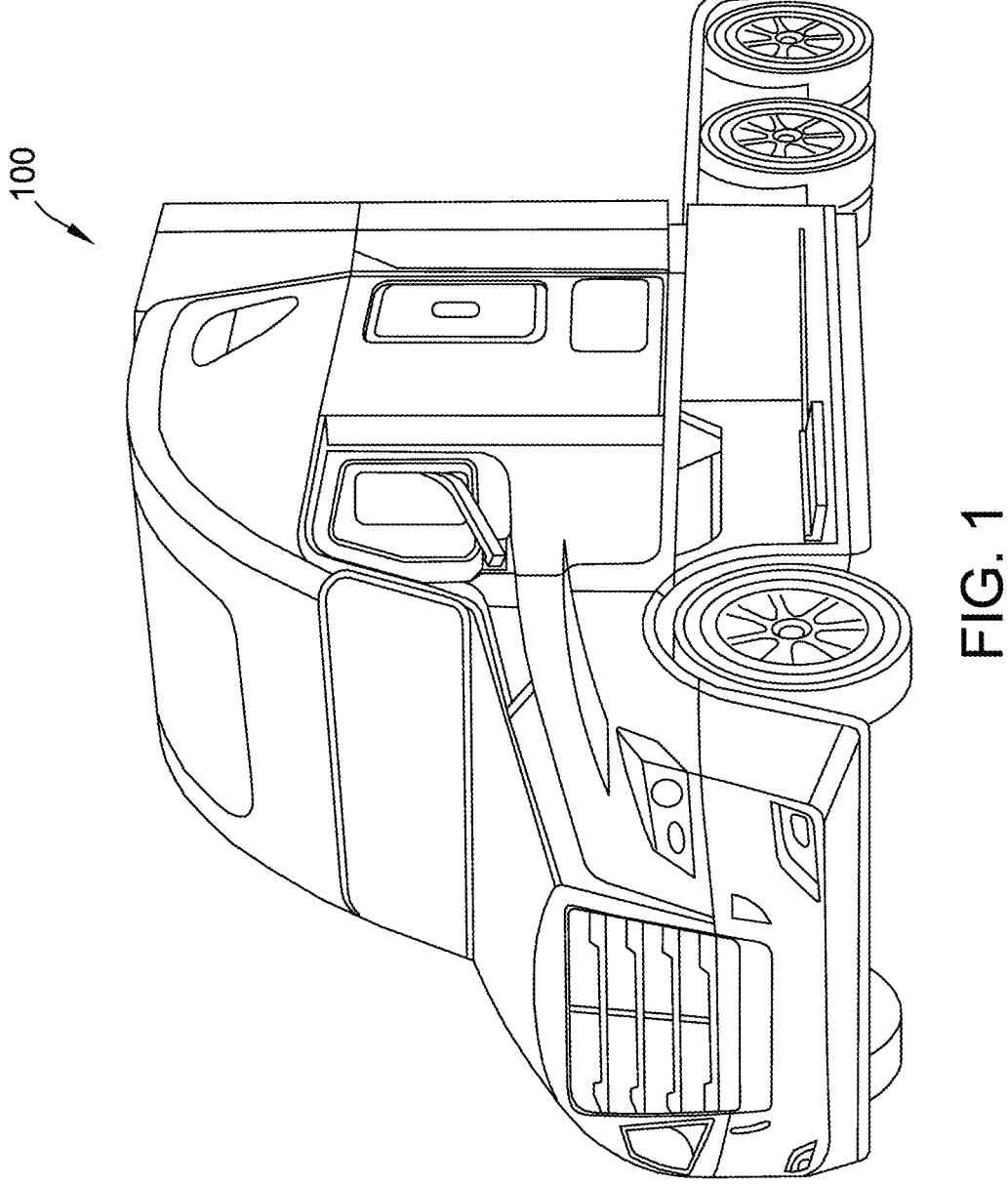
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The systems and methods described herein provide a display that can be attached to a trailer connected to an autonomous vehicle to signal to drivers and vehicles around the autonomous vehicle. The signaling display may include one or more display panels (e.g., LCD displays or LED displays) that attach to a rear portion of a trailer. In certain embodiments, signaling displays may be fixed to exterior surfaces of the trailer using a support structure.

One conventional solution for operating an autonomous vehicle is to adjust driving condition and driving profile to mimic non-autonomous drivers, thereby preventing non-autonomous vehicles from suspecting autonomous operation. However, these solutions lack a mechanism to communicate future actions and intentions of the autonomous vehicle to the surrounding vehicles. Another existing solution involves equipping trailers of autonomous vehicles with displays, however, this solution does not resolve or reduce the visual obstruction caused by the autonomous vehicle.

The disclosed autonomous vehicle includes various sensors and software modules for perceiving, for example, conditions on the road ahead. The autonomous vehicle may deploy, for example, an RGB camera to perceive the conditions on the road. Such road conditions may include traffic events, road construction, road or lane closures, line or utility work, convoys, damaged or displaced infrastructure, or weather conditions such as snow or ice, among others. The messages displayed by the intent signaling systems informs nearby drivers and vehicles of perceived conditions and, thereby, the autonomous vehicle's intended response, i.e., its intent.

The autonomous vehicle continuously collects data from numerous sensors and processes and compiles that data into a model representing the environment, or "world," around the autonomous vehicle, i.e., a "world model." The model is an input to further processing in the autonomous vehicles autonomy computing system and, in particular, for example, a behavior planning module that computes actions the autonomous vehicle will take. The world model and planned actions, or trajectories, from the behavior planning module are employed in the disclosed systems and methods for signaling intent. In alternative embodiments, processed sensor data may be employed independent of the world model.

Where the world model or sensor data indicate a road condition ahead, the system receives data from the autonomy computing system indicating a remedial action to be performed by the autonomous vehicle in response to the condition. In alternative embodiments, the processing system receives data directly from the sensor on the autonomous vehicle. The processing system then processes the data to generate a message for display on the trailer. For example, the intent signaling system generates, for example, a text message, symbols, or a combination of both for display on the signaling display. The message may, in certain embodiments, be a duplication of data in the world model, or a simplified version easier for drivers or vehicles to interpret. For example, the message may include a countdown to execution of the remedial action to alert the drivers. In some embodiments, the message is displayed on a portion of the signaling display. In alternative embodiments, an image or video stream captured by a forward looking or side looking camera, for example, may be displayed on the intent signaling system to be observed by nearby drivers and vehicles. In another alternative embodiment, the intent signaling system may receive third party data relating to traffic conditions, weather, or navigation that can be relayed to other drivers and vehicles by the disclosed intent signaling systems and methods.

The disclosed systems and methods include a processing system such as an autonomy computing system or another embedded computing system, such as an electronic control unit (ECU). The processing system includes at least one or more processors and one or more memory devices. The one or more memory devices include a section of memory storing a signaling display module, which may be a hardware module, a software module, or a combination of hardware and software.

In alternative embodiments, the processing system may transmit a deploy or stow command or a message for display over one or more wired or wireless communication channels to one or more other processing systems local to the signaling display, such as an ECU or other embedded computing system. Wired communication channels may include a serial bus, a peripheral bus, CAN bus, or other suitable data link. Wireless communication channels may include Wi-Fi, NFC, Bluetooth, or other suitable data link.

Figure 2:
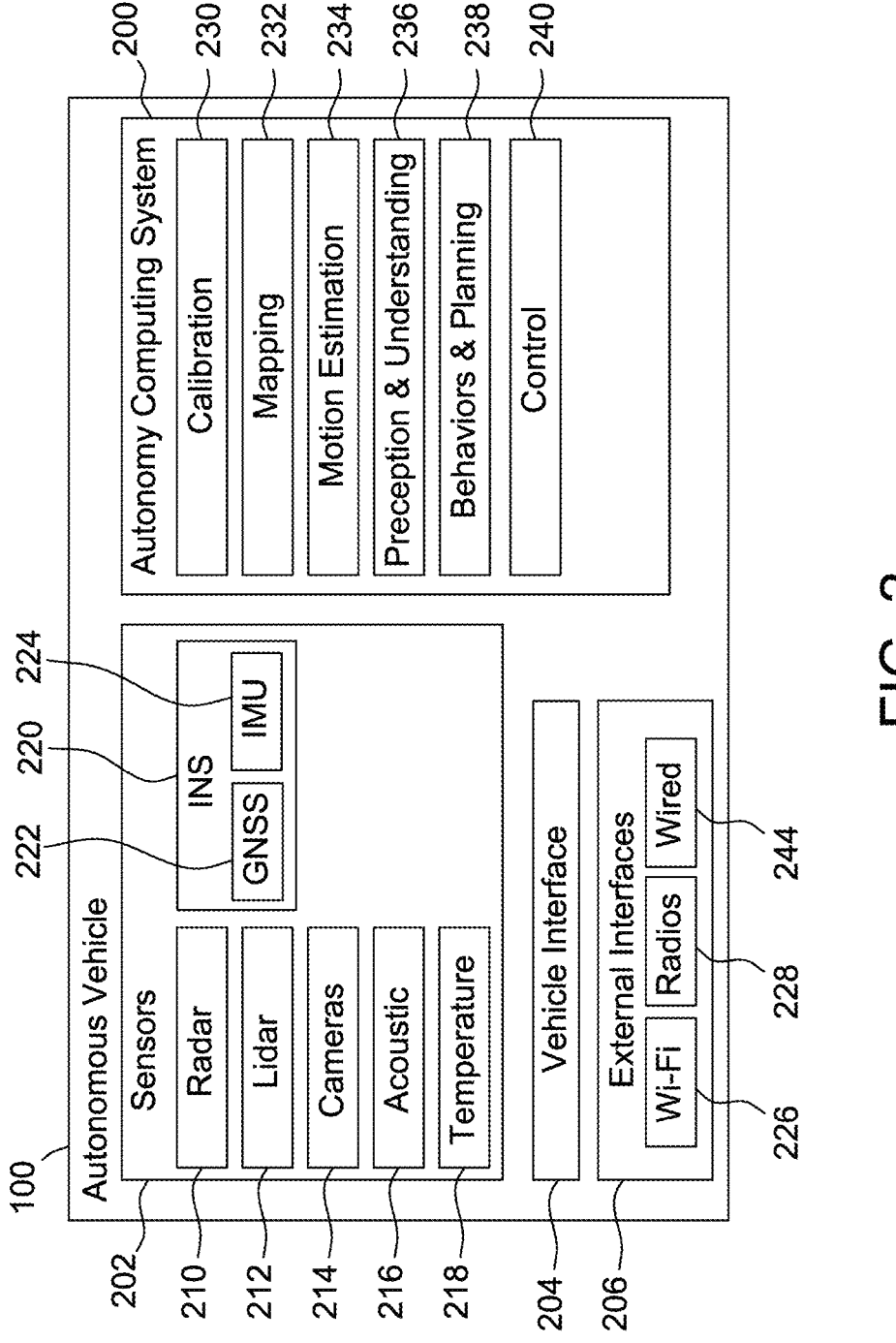
FIG. 2 is a block diagram of an autonomous vehicle.

FIG. 1 is a schematic diagram of an autonomous vehicle 100 that may further be conventionally connected to a single or tandem trailer to transport the trailers (not shown) to a desired location. FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 120 to determine how to control operation of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be stitched or combined to generate a visual representation of the multiple cameras' FOVs, which may be used to, for example, generate a bird's eye view of the environment surrounding autonomous vehicle 100. In some embodiments, the image data generated by cameras 214 may be sent to autonomy computing system 200 or other aspects of autonomous vehicle 100, and this image data may include autonomous vehicle 100 or a generated representation of autonomous vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. Radar sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around autonomous vehicle 100.

GNSS receiver 222 is positioned on autonomous vehicle 100 and may be configured to determine a location of autonomous vehicle 100, which it may embody as GNSS data, as described herein. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, and or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, and a control module or controller 240. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 3:
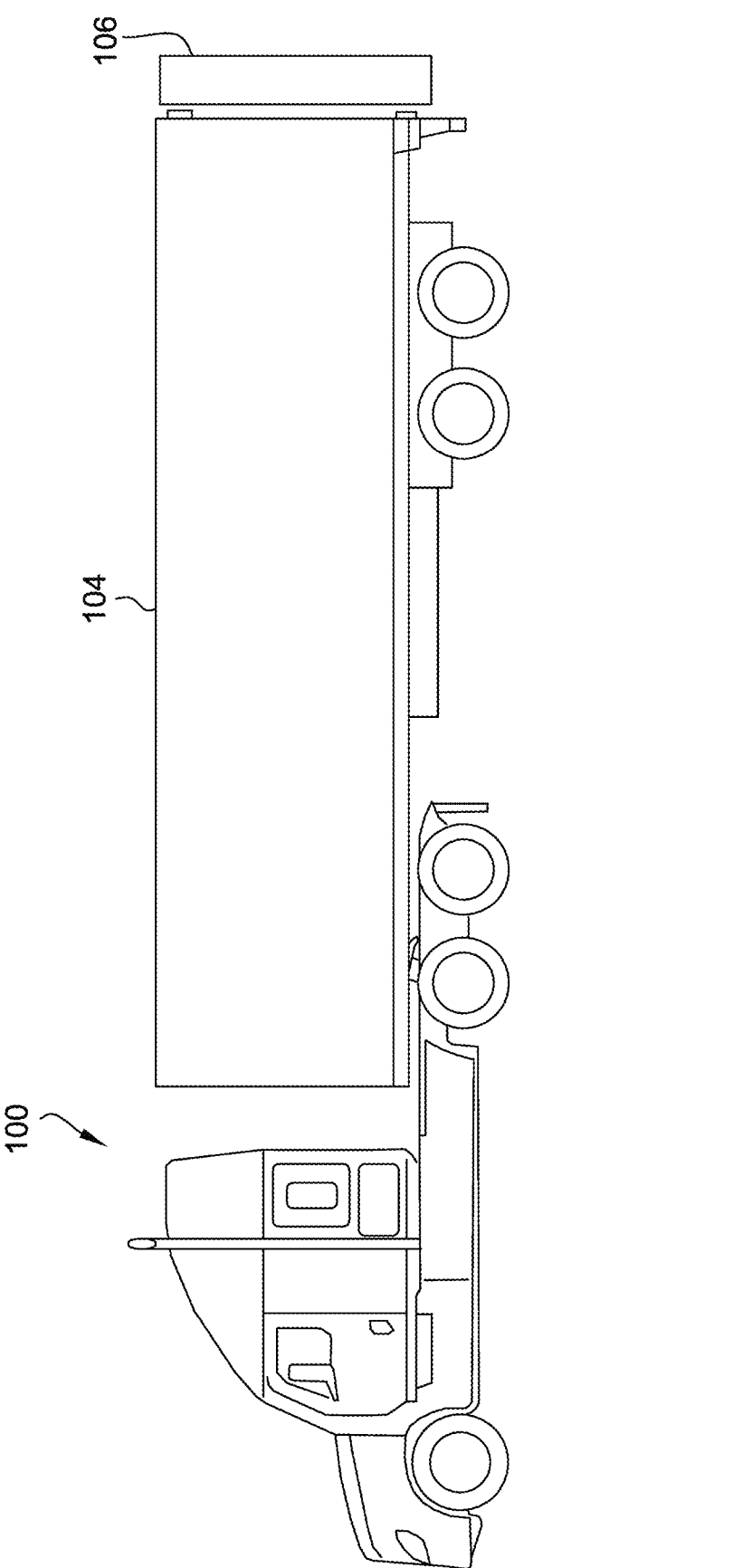
FIG. 3 is an illustration of an embodiment of the signaling display attached to a trailer.

FIG. 3 is an illustration of an embodiment of the signaling display 104 displayed on a trailer 104 connected to autonomous vehicle 100. The signaling display 104 is attached to a trailer by a support structure 106. For example, signaling display 104 is detachably mounted to the rear portion of trailer 104 by the support structure 106. The signaling display may include LCD displays or LED displays. In some embodiments, the brightness of the signaling display 104 is adjustable based on the environment of the signaling display 104. For example, the signaling display can be darker at night to reduce light pollution and eye strain for other drivers and vehicles. Alternatively, the display can increase brightness to allow drivers and other vehicles to interpret the signaling display 104.

Figure 4:
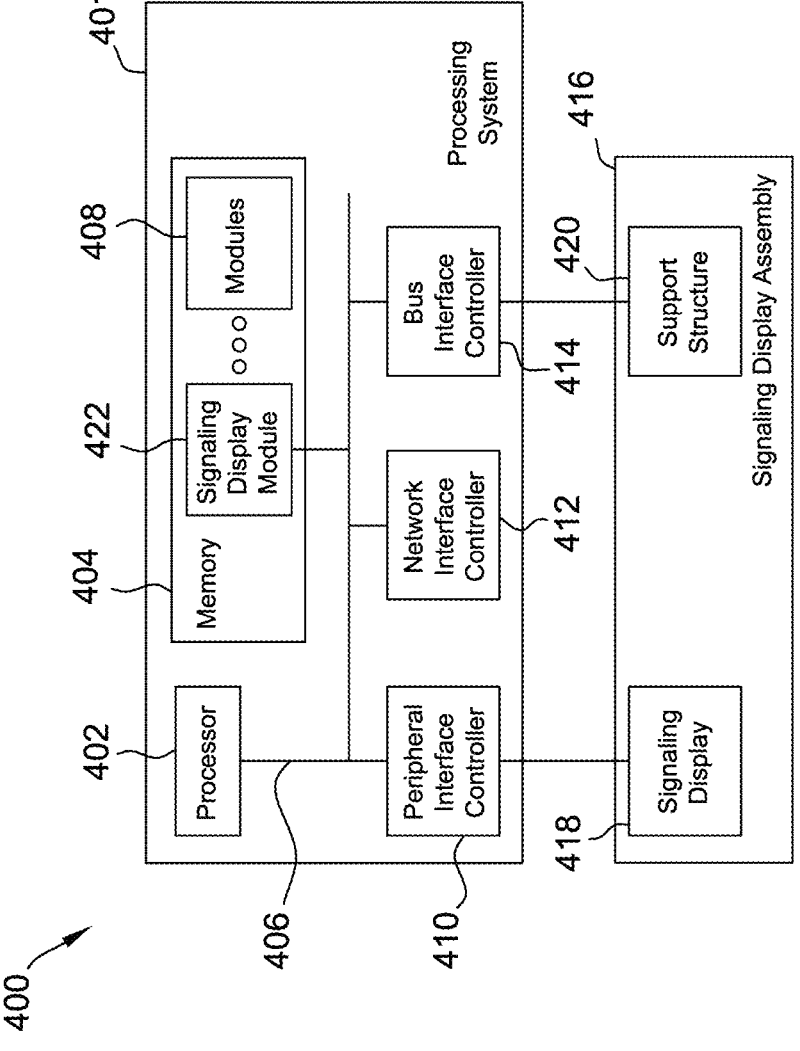
FIG. 4 is a block diagram of an embodiment of an intent signaling display system.

FIG. 4 is a block diagram of an embodiment of an intent signaling system 400. Intent signaling display system includes a processing system 401 that may be embodied in an autonomy computing system, an electronic control unit (ECU), or other suitable embedded computing system. Processing system 401 includes at least one processor 402 and a memory 404. Processor 402 is coupled to memory 404 via a system bus 406. In the example embodiment, memory 404 includes one or more devices that enable information, such as executable instructions or other data, to be stored and retrieved. Memory 404 includes one or more computer readable media, such as, without limitation, dynamic random access memory (DRAM), static random access memory (SRAM), a solid state disk, or a hard disk. In the example embodiment, memory 404 stores, without limitation, application source code, application object code, configuration data, additional input events, application states, assertion statements, validation results, or any other type of data. In particular, memory 404 stores a signaling display module 422, including program code, and one or more additional software modules 408.

Processing system 401 further includes various interface controllers for communicating with other processing systems of autonomous vehicle 100, data networks, peripheral devices, sensors, controllers, ECUs, or one or more other systems or subsystems of autonomous vehicle 100. The interface controllers include a peripheral interface controller 410 for communicating with one or more peripheral devices, such as sensors (shown in FIG. 2). The interface controllers include a network interface controller 412 for communicating over one or more data networks, such as the Internet. The interface controllers include a bus interface controller 414 for communicating with one or more devices sitting on a bus, such as a CAN bus local to autonomous vehicle 100.

In the example embodiment, processor 402 is configured by accessing one or more sections of program code in memory 404 or another memory device, and executing that program code to perform one or more functions. In operation, a processor 402 executes computer-executable instructions embodied in one or more computer-executable components stored on one or more computer-readable media, such as memory 404, to implement, for example, signaling display module 422.

Signaling display module 422 controls operation of a signaling display assembly. Signaling display 418 can be detachably connected to a trailer to signal to drivers and vehicles around the autonomous vehicle. Signaling display module 422 controls operation of a signaling display assembly 416, including a signaling display 418 and a support structure 420. Signaling display 418 can be connected to the trailer by the support structure 420 to signal to drivers and vehicles around the autonomous vehicle. Signaling display 418 may include one or more display panels (e.g., LED displays) that can extend parallel to the rear portion of the trailer connected to the autonomous vehicle on the support structure 420. Alternatively, signaling display 418 may include one or more display panels that attach to the trailer in a position sufficient for following drivers and vehicles to observe. Support structure 420 is configured to secure signaling display 418 to the trailer connected to the autonomous vehicle.

FIG. 5A-F are illustrations of example signaling displays that may be embodied in, for example, signaling display 104 shown in FIGS. 2-3 or signaling display 418 shown in FIG. 4. The signaling displays are illustrated in portrait aspect and a landscape aspect, consistent with, for example, a side mounting on the autonomous vehicle and a vertical mounting on the autonomous vehicle, respectively. More specifically, FIG. 5A illustrates a signaling display indicating "ROAD CLOSED AHEAD," which signals to drivers and vehicles around the autonomous vehicle that a road closure is perceived by the autonomous vehicle and may not be observable by the other drivers and vehicles. Moreover, the signal implies the autonomous vehicle may modify its trajectory in response to the road closure, although which lane or lanes of the road are closed is either unknown or at least not signaled.

FIG. 5B illustrates a signaling display indicating "ROAD CONSTRUCTION LEFT LANE BLOCKED," which signals to drivers and vehicles around the autonomous vehicle that the left lane ahead is blocked due to ongoing road construction. The signal implies caution and that the autonomous vehicle may modify its trajectory in response to the lane closure. For example, if the autonomous vehicle is operating in the left lane, the signal implies the autonomous vehicle is planning to merge from that lane and to proceed cautiously through an area of road construction. If the autonomous vehicle is operating in another lane, the signal implies the autonomous vehicle may reduce speed as a courtesy to other drivers and vehicles that may need to merge, and to proceed cautiously through an area of road construction.

FIG. 5C illustrates a signaling display indicating "TRAFFIC AHEAD 10 MINUTE DELAY," which signals to drivers and vehicles around the autonomous vehicle that the autonomous vehicle perceives traffic congestion ahead and anticipates a slowdown. The signal also indicates an estimate of the delay, which may be derived, for example, heuristically based on recently observed traffic flow in the area or based on a detected speed of the traffic.

FIG. 5D illustrates a signaling display indicating "LINE WORK AHEAD", which signals to drivers and vehicles around the autonomous vehicle that the autonomous vehicle perceives line or other utility workers overhead in the area ahead. The signal implies the autonomous vehicle intends to reduce speed or potentially change lanes to avoid the line work.

FIG. 5E illustrates a signaling display indicating "MERGING LEFT", which signals to drivers and vehicles around the autonomous vehicle that the autonomous vehicle intends to merge left on the road ahead.

FIG. 5F illustrates a signaling display indicating "ACCIDENT IN RIGHT LANE", which signals to drivers and vehicles around the autonomous vehicle that the autonomous vehicle perceives an accident on the roadway ahead, specifically in the right lane. The signal implies the autonomous vehicle intends to reduce speed, merge, or a combination of both.

Embodiments shown in FIGS. 5A-5F generally describe conditions observed by the autonomous vehicle. Alternatively, the messages displayed, in certain embodiments, are prescriptive and help inform, suggest, or potentially instruct nearby drivers and vehicles to take an action.

FIG. 6 is a flow diagram of one embodiment of a method 600 of intent signaling on an autonomous vehicle, such as the autonomous vehicle shown in FIG. 3. More specifically, method 600 may be embodied, for example, in a processing system onboard autonomous vehicle 100, such as autonomy computing system 200 or intent signaling system 400 (shown in FIG. 4). Referring to the embodiment shown in FIG. 4, intent signaling system 400 receives 610 data descriptive of a condition nearby autonomous vehicle 100. The condition may include, for example, a road closure, construction, line work, a lane closure, traffic congestion, etc. The data may be received 610 from a remote data source, such as a navigation system, municipal broadcasting system, or a weather service. Alternatively, the data may be received 610 from one or more sensors onboard autonomous vehicle 100, such as sensors 202 shown in FIG. 2. In another alternative embodiment, the data may be received 610 from autonomy computing system 200, for example, in the form of a world model describing the environment in which autonomous vehicle 100 is operating.

In certain embodiments, intent signaling system 400 receives 620 an indication of a remedial action to be executed by the autonomous vehicle 100 in response to the detected condition. The autonomy computing system 200 determines the remedial action based on the processed sensor data. For example, the remedial action includes executing a change in speed, a lane change, or other autonomous vehicle operations. In alternative embodiments, the intent signaling system 400 includes receiving 620 sensor data as the indication of the remedial action. Intent signaling system 400 generates 630 a message relating to the remedial action based on the condition. Generating 630 the message may include, for example, translating or copying the data directly into the message. Alternatively, processing system 401 may use the indication to index into an array of messages, or a table of messages, or another data structure such as a priority queue or map, to generate at least one element of the message to be displayed. For example, the indication received from autonomy computing system 602, e.g., the world model or planning module, may be more comprehensive than the message needs to be. Accordingly, processing system 401 indexes into a map based on one or more elements of the indication to generate a simpler message that can be displayed for the benefit of other drivers and vehicles around autonomous vehicle 100.

Once the message is generated, intent signaling system 400 transmits 640 the message to signaling display 418 for display to nearby drivers or vehicles. Upon display 640 of the message, the autonomous vehicle 100 initiates the remedial action. In various embodiments, the message will be displayed during the remedial action. The message may be removed from the display upon completion of the remedial action. Alternative embodiments remove the message from the display 418 upon execution of the remedial action.

Figure 7:
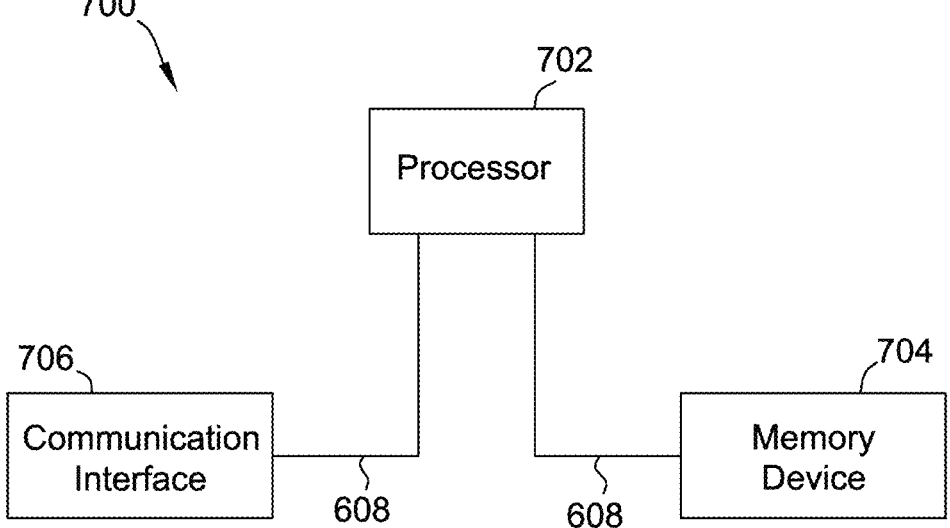
FIG. 7 is a block diagram of an example computing device.

FIG. 7 is a block diagram of an example computing device 700. Computing device 700 includes a processor 702 and a memory device 704. The processor 702 is coupled to the memory device 704 via a system bus 708. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 704 includes one or more devices that enable information, such as executable instructions or other data (e.g., sensor data), to be stored and retrieved. Moreover, the memory device 704 includes one or more computer readable media, such as, without limitation, dynamic random access memory (DRAM), static random access memory (SRAM), a solid state disk, or a hard disk. In the example embodiment, the memory device 704 stores, without limitation, application source code, application object code, configuration data, additional input events, application states, assertion statements, validation results, or any other type of data. The computing device 700, in the example embodiment, may also include a communication interface 706 that is coupled to the processor 702 via system bus 708. Moreover, the communication interface 706 is communicatively coupled to data acquisition devices.

In the example embodiment, processor 702 may be programmed by encoding an operation using one or more executable instructions and providing the executable instructions in the memory device 704. In the example embodiment, the processor 702 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the methods, systems, and apparatus described herein includes at least one of: (a) displaying nearby road or other conditions to nearby drivers and vehicles; (b) signaling intent of the autonomous vehicle in response to perceived nearby conditions; and (c) improving awareness of nearby conditions and planned cations of the autonomous vehicle for nearby drivers or vehicles.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for signaling intent on a trailer of an autonomous vehicle, the system comprising:

at least one sensor disposed on the autonomous vehicle, the at least one sensor configured to generate sensor data descriptive of a condition sensed near the autonomous vehicle, the condition including a road condition of a road along which the autonomous vehicle is traveling, the road condition causing changes in navigation of vehicles traveling on the road;

a processing system communicatively coupled to the at least one sensor, the processing system comprising a processor coupled to a memory, the memory storing executable instructions that, upon execution by the processor, configure the processor to:

receive data from an autonomy computing system of the autonomous vehicle corresponding to a remedial action of the autonomous vehicle in response to the condition; and process the sensor data and the data from the autonomy computing system to generate a message including the road condition and third-party data associated with the road condition and indicating the remedial action of the autonomous vehicle; and a signaling display attached to a trailer of the autonomous vehicle, the signaling display configured to display at least one of the sensor data or the message, wherein the signaling display is communicatively coupled to the processing system.

2. The system of claim 1 further comprising a support structure mounted to the trailer, the support structure configured to attach the signaling display to the trailer.

3. The system of claim 2, wherein the signaling display is attached to a rear portion of the trailer.

4. The system of claim 1, wherein the at least one sensor comprises an RGB camera.

5. The system of claim 4, wherein the signaling display is an LCD display.

6. The system of claim 1, wherein the processor is further configured to adjust a brightness of the signaling display.

7. The system of claim 1, wherein the processor is further configured to initiate display of the message on the signaling display before the autonomous vehicle otherwise responds to the condition.

8. A processing system for signaling intent of an autonomous vehicle, the processing system comprising:

a memory storing executable instructions representing a signaling display module on a trailer of an autonomous vehicle;

a processor coupled to the memory and configured to execute the signaling display module, the processor, upon execution of the signaling display module, configured to:

receive data from an autonomy computing system descriptive of a condition near the autonomous vehicle, the condition including a road condition of a road along which the autonomous vehicle is traveling, the road condition causing changes in navigation of vehicles traveling on the road;

process the data to generate a message relating to the condition, the message including the road condition and third-party data associated with the road condition, wherein the message indicates a remedial action of the autonomous vehicle in response to the condition;

transmit the message to a signaling display on the trailer prior to executing the remedial action of the autonomous vehicle; and cause, the signaling display, to display the message.

9. The processing system of claim 8, wherein the processor is further configured to initiate display of the data descriptive of the condition on the signaling display.

10. The processing system of claim 8, wherein the processor is further configured to receive the data directly from a sensor onboard the autonomous vehicle.

11. The processing system of claim 10, wherein the sensor is a RGB camera.

12. The processing system of claim 8, wherein the signaling display is an LCD display.

13. The processing system of claim 8, wherein the processor is further configured to initiate display of the message on a portion of the signaling display.

14. The processing system of claim 8, wherein the processor is further configured to initiate display of a countdown to the remedial action of the autonomous vehicle on the signaling display.

15. A method of signaling intent of an autonomous vehicle, the method comprising:

receiving data descriptive of a condition near the autonomous vehicle connected to a trailer, the condition including a road condition of a road along which the autonomous vehicle is traveling, the road condition causing changes in navigation of vehicles traveling on the road;

receiving an indication from an autonomy computing system of a remedial action of the autonomous vehicle in response to the condition;

generating, based on the indication, a message including the road condition and third-party data associated with the road condition and indicating the remedial action of the autonomous vehicle to the condition;

transmitting the message to a signaling display on the trailer of the autonomous vehicle for display on the signaling display;

causing, the signaling display, to display the message; and initiating the remedial action by the autonomous vehicle.

16. The method of claim 15, wherein the condition is selected from a group consisting of:

a road closure, a road construction, a traffic event, and a change in road conditions.

17. The method of claim 15, wherein receiving the data further comprises receiving the data from a plurality of sensors disposed on the autonomous vehicle.

18. The method of claim 15, wherein receiving the data further comprises receiving the data from an autonomy computing system.

19. The method of claim 15, wherein processing the data comprises employing the data to index into a map of messages to generate at least one element of the message to be displayed.

20. The method of claim 15 further comprising receiving the data descriptive of the condition from an RGB camera disposed on the autonomous vehicle.

\* \* \* \* \*